United States Patent [19]

Taylor

[11] 4,214,454
[45] Jul. 29, 1980

[54] WATER RECOVERY SYSTEM

[76] Inventor: James C. Taylor, #8 Tribute Ct., Newport Beach, Calif. 92663

[21] Appl. No.: 874,234

[22] Filed: Feb. 1, 1978

[51] Int. Cl.² .......................................... F25B 29/00
[52] U.S. Cl. ...................................... 62/173; 62/179; 55/269; 202/185 R; 203/10; 203/DIG. 4
[58] Field of Search ....................... 203/49, 10, 11, 26, 203/DIG. 4, 2; 202/234, 160, 185 R; 62/90, 176 D, 184, 186, 173, 179; 55/269

[56] References Cited

U.S. PATENT DOCUMENTS

| | | | |
|---|---|---|---|
| 1,819,643 | 8/1931 | Fleisher | 62/90 |
| 2,438,120 | 3/1948 | Freygang | 62/90 |
| 3,119,239 | 1/1964 | Sylvan | 62/90 |
| 3,148,514 | 9/1964 | Mathis | 62/184 |
| 3,404,537 | 10/1968 | Leonard | 203/DIG. 4 |
| 3,759,054 | 9/1973 | Graber | 62/184 |
| 3,798,920 | 11/1972 | Morgan | 62/90 |

Primary Examiner—Wilbur L. Bascomb, Jr.
Attorney, Agent, or Firm—Romney, Schaap, Golant, Disner & Ashen

[57] ABSTRACT

An apparatus for transforming the water vapor in the atmosphere into liquid water comprising a precipitating chamber, a mixing chamber, heat transfer system, and means for moving atmospheric air through the system.

A method of producing liquid water from the atmosphere comprising the steps of passing a first stream of air past a heat absorbing element of a heat transfer system to cause water to precipitate onto the heat absorbing element; mixing the first air stream with a second air stream; passing the mixed air streams past the heat dissipating element of the heat transfer system; varying the proportion of amount of air from the first and second air streams to a predetermined ratio which is a function of the atmospheric conditions.

12 Claims, 3 Drawing Figures

WATER RECOVERY SYSTEM

BACKGROUND OF THE INVENTION

1. Field of the Invention

The present invention relates to a water recovery system and, more particularly, to an apparatus and method for transforming the water vapor present in the atmosphere into water fit for human consumption, although the invention may be utilized by industrial facilities which require water for operation.

2. Description of the Prior Art

Several types of systems are available which are capable of turning atmospheric humidity into liquid water. Such systems are commonly referred to as dehumidification systems. A common type passes air through a coil which is cooled below the dew point of the outside air. Such systems presently suffer from the disadvantage that they require large amounts of energy which make them commercially impracticable.

Such water recovery systems, if they were economically feasible, would be of great advantage in areas of the world where there is sparce rainfall, although appreciable relative humidity. For example, in a desert area adjacent to an ocean, the relative humidity may be significant during most of the year, but the amount of rainfall received would be small. The advantages of a device which is capable of transforming the relative humidity of the atmosphere into water which is both suitable for consumption by humans and commercial purposes are easily seen. Also, a system which could be adapted for individual homes and commercial establishments would be highly desirable.

Present systems such as desalinization systems suffer from the disadvantages that they require that piping be installed to carry salt water to the facility and require large amounts of energy to operate which make them economically unfeasible in many instances.

What is presently needed is a system which will overcome the disadvantages present in the prior art.

SUMMARY AND OBJECTS OF THE INVENTION

The above-mentioned problems of the prior art have been overcome by the present invention which fulfills the stated requirements. The present invention is a water recovery system using refrigeration which is capable of economically converting the water vapor present in the atmosphere into water which may be transformed to a form suitable for human consumption or commercial purposes.

A general object of the invention is to provide a commercially feasible method of extracting water vapor from the atmosphere in a relatively short period of time.

A primary object of the invention is to provide a water recovery system which is simply constructed and economical to produce.

Yet another object of the invention is to provide a water recovery system which is reliable and may be used by those with no technical background.

Still another aspect of the invention is to provide a water recovery system which may be installed and operated at a cost less than that required for comparable desalinization plants.

Other objects and advantages of the invention will appear from the following description taken in conjunction with the accompanying drawings.

DESCRIPTION OF THE PREFERRED EMBODIMENTS

Figure 1:
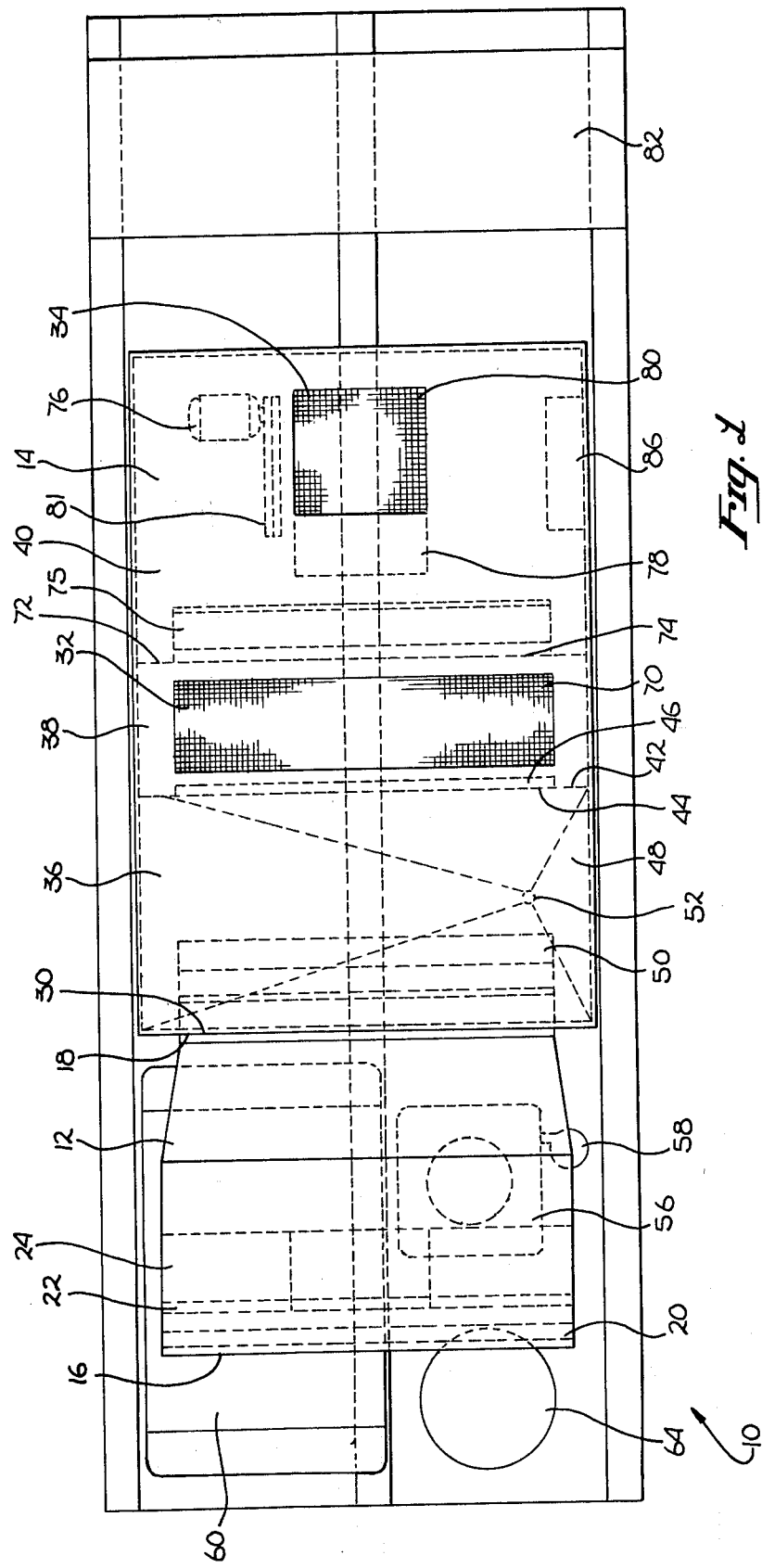
FIG. 1 is a plan view of a preferred embodiment of my water recovery system.

While the present invention is susceptible to modifications and alternative constructions, an illustrative embodiment is shown in the drawings and will be described in detail hereinbelow. It should be understood, however, that it is not the intention to limit the invention to the particular form disclosed; but on the contrary, the intention is to cover all modifications, equivalences and alternative constructions falling within the spirit and scope of the invention as expressed in the appended claims.

Figure 2:
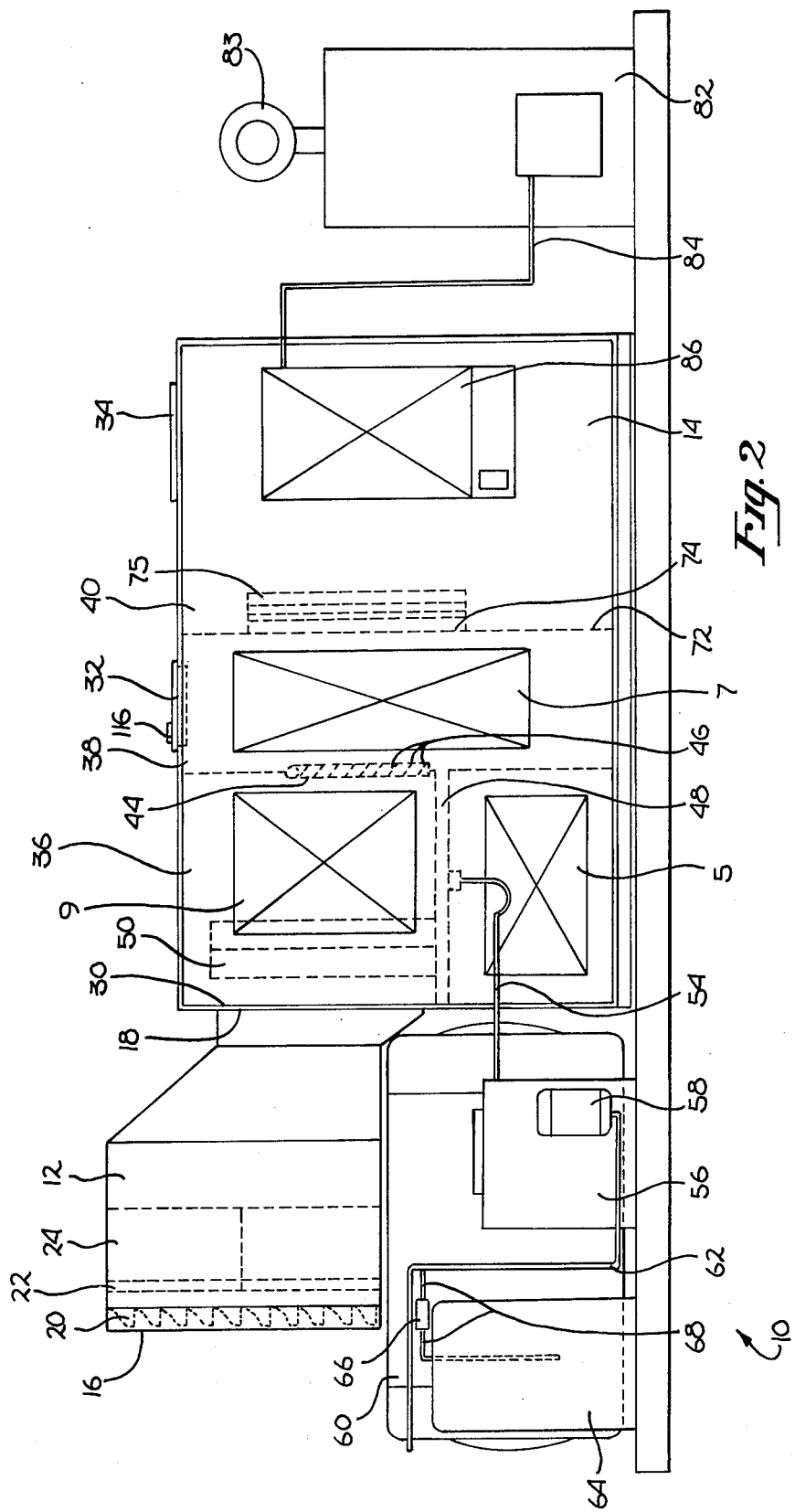
FIG. 2 is an elevational view of a preferred embodiment of my water recovery system.

Referring initially to FIGS. 1 and 2 collectively, there is shown therein my water recovery system 10.

The water recovery system comprises an air intake housing 12 and an enclosure 14.

The air intake housing 12 has an input port 16 and an output port 18. The enclosure 14 has an input opening 30, air vent 32 and exhaust vent 34.

Located within the air intake housing 12 are air intake louvers 20, air prefilter 22 and high efficiency air filter 24. The air intake louvers 20 are located in the vicinity of the input port 16 within the air intake housing 12 and are fixed in the open position and serve to protect the interior of the air intake housing 12 and the air prefilter and high efficiency air filter 22 and 24, respectively, from damage due to rain. The air prefilter 22 is located between the input port 16 and the high efficiency air filter 24 and serves to remove large particles of contaminants such as dirt, sand, debris and the like from air which enters the input port 16. The high efficiency air filter 24 is designed to eliminate smaller particles of contaminants from the air after the air has been initially cleansed of larger contaminant particles by the air prefilter 22.

The air intake housing 12 is connected to the enclosure 14 by conventional means well known to those skilled in the art. The air intake housing is connected to the enclosure in such a manner that the output port 18 is flush with the input opening 30 and the output port covers the input opening so that during operation air will not be able to enter the input opening unless it has first entered the input port 16.

Access panels 5, 7 and 9 are provided for the enclosure 14 so that entry into the enclosure for repairs, cleaning, etc. may be easily accomplished.

The enclosure 14 comprises a precipitating chamber 36, mixing chamber 38, and elimination chamber 40.

The precipitating chamber 36 is separated from the mixing chamber 38 by a panel 42 which is continuous and has an opening 44. In the opening 44 is located coil louvers 46 which when in the closed position prevent air from flowing through the opening 44 from the precipitating chamber to the mixing chamber. Conversely, when the coil louvers 46 are in the open position air is free to flow from the precipating chamber to the mixing chamber through the opening 44.

Inside the precipitating chamber 36 is located a stainless steel drain pan 48 and water elimination coil 50. The drain pan 48 is located below the water elimination coil 50. At the bottom of the drain pan 48 is located an opening 52 to which is connected to fluid transfer means such as a pipe 54. The pipe 54 is also connected to a water collection tank 56. A transfer pump 58 is provided for transferring water from the collection tank 56 to a water storage tank 60 by means of a pipe 62, the transfer pump is activated when the level of water in the collection tank reaches a predetermined level by means of an automatic device which is well known to those having ordinary skill in the art.

Located between the water collection tank 56 and the water storage tank 60 is a chemical storage tank 64, chemical inducing pump 66 and pipe 68. The pipe 68 is connected to the pipe 62 at junction A in a conventional manner. The chemical storage tank 64 contains chemicals well known to those skilled in the art for chemically treating the water which is pumped into the water storage tank. The chemical inducing pump 66 is provided for injecting controlled amounts of water treatment chemicals into the pipe 62 at junction A as water is being pumped into the water storage tank 60. These chemicals are well known to those having ordinary skill in the art and it is not deemed necessary to describe them.

At the top of the mixing chamber 38, the air vent 32 is covered by a screen 70 which prevents large objects from entering the mixing chamber by means of the air vent. Located at the air vent 32 are outside air louvers 116. When the outside air louvers 116 are open, outside air is free to travel from the environment surrounding the enclosure into the mixing chamber 38 by means of the air vent 32. Accordingly, when the outside air louvers are in the closed position, air is prevented from entering the mixing chamber from the outside environment by means of the air vent 32.

The mixing chamber is separated from the elimination chamber 40 by means of a panel 72. The panel 72 has an opening 74 through which air may pass from the mixing chamber to the elimination chamber. Located in the elimination chamber side are a condenser coil 75, a fan motor 76 and a fan 78.

The condenser coil 75 is mounted adjacent to the opening 74 in such a manner that air traveling from the mixing chamber to the elimination chamber will come into contact with the outer surface of the condenser coil.

The fan which is operably connected to the fan motor by means of a belt 81 is operated so that air is blown out of the elimination chamber through the exhaust vent 34. The exhaust vent 34 also is covered by a screen 80 which is attached in a conventional manner to the enclosure immediately surrounding the exhaust vent. The screen 80 prevents the high speed elimination by any projectiles which may inadvertently or accidentally be expelled by the fan 78 and also prevents objects from being dropped into the fan through the exhaust vent from the surrounding environment.

A power generating means is provided for supplying electrical power to the system. Such power generating means may be a combined conventional diesel engine-electrical generator 82. It will be understood that other electrical power sources may be used.

A muffler 83 is attached to the exhaust of the diesel engine to decrease the noise pollution of the engine.

The electrical output of the electrical generator is connected by means of a power cable 84 to an electrical panel 86 for distribution to all units which require electrical power.

Figure 3:
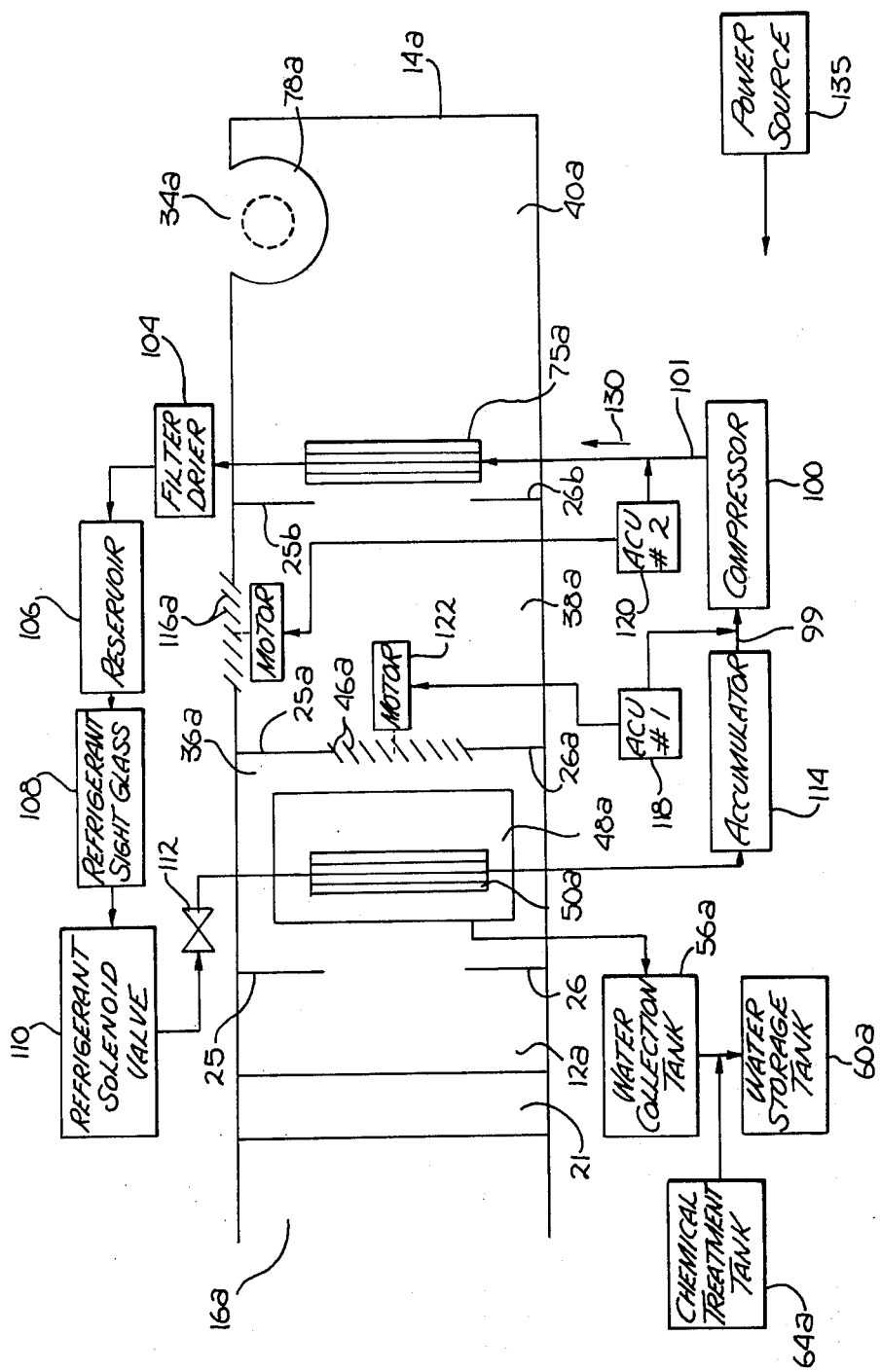
FIG. 3 is a diagrammatic representation of my invention.

Now referring to FIG. 3, there is illustrated therein an enclosure 14a, having an input port 16a, an air vent 32a and an exhaust vent 34a.

The enclosure 14a comprises an air intake channel 12a, a precipitating chamber 36a, a mixing chamber 38a and an elimination chamber 40a.

In the intake channel 32 is located an air filter 21. The purpose of the air filter 21 is to eliminate particles of contaminants from the air which may enter the enclosure through the input port 16a. The filter not only insures that particles of sand and dirt will be eliminated from the air and thus will be prevented from being present in the water produced by the system, but also insures that the air passing through the air intake channel and precipitating chamber 36a is clean, thus keeping dirt and other particles from deteriorating the system components.

Heat transfer means such as a compressor 100, condenser coil 75a, combination filter-drier 104, reservoir 106, refrigerant sight glass 108, refrigerant solenoid valve 110, expansion valve 112, water elimination coil 50a and accumulator 114 is provided for the transfer of heat from the water eliminator coil 50a to the condenser coil 75a, in a manner which is well known to those having ordinary skill in the art.

In the precipitating chamber 36a is located the water elimination coil 50a which will remove water vapor from the air during operation. The process by which the water vapor is removed from the air is discussed in detail hereinbelow. The water elimination coil 50a is designed in such a way that air will come into contact with its outer surface. The panels 25, 26, 25a and 26a are situated so that the amount of air coming into contact with the outer surface of the water elimination coil is maximized when air flows through the precipitation chamber.

Located in the precipitation chamber under the water elimination coil is a drain pan 48a for catching water which precipitates onto the water elimination coil during operation. The drain pan 48a is connected to a water collection tank 56a in such a manner that water may flow from the drain pan 48a to the collection tank 56a.

A large water storage tank 60a is provided in the preferred embodiment. When desired, water may be transferred from the water collection tank to the water storage tank 60a. Chemical treatment of the water may be performed as the water travels to the storage tank or within the storage tank.

In the preferred embodiment, a chemical treatment tank 64a is provided from which chemicals for purifying water may be added to the water obtained as water is transferred from the water collection tank to the water storage tank.

In the opening between the panels 25a and 26a are located coil louvers 46a. The coil louvers 46a are of such a construction that they may be continuously varied from a totally open position, which will not obstruct the air flow between the precipitating and mixing chamber, to a completely closed position which will prevent air from passing therethrough. As can be seen, if the coil louvers 46a are closed, no air will flow through the input port 16a.

Outside air louvers 116a are mounted in the air vent 32a. The outside air louvers 116a are of a type which may be continuously varied from a completely closed position, which will prevent the passage of air therethrough, to a totally open position whereupon the outside air louvers will present negligible opposition to the flow of air through the air vent 32a.

The condenser coil 75a is mounted in the elimination chamber in the vicinity of the opening formed by panels 25b and 26b. The condenser coil 75a is located so that the amount of air passing from the mixing chamber to the elimination chamber which comes into contact with the outside surface of the condenser coil is maximized. It should be noted that it is possible to locate the condenser coil in the mixing chamber near the opening and achieve the same results.

An exhaust fan 78a is located at the exhaust vent 34a. The fan is connected so that it will expell air from the elimination chamber through the exhaust vent.

The compressor in my system is of the standard type having a suction side input 99 and a discharge side output 101. The discharge side output 101 is connected by means of tubing conventional for heat transfer systems to the input of the condenser coil 75a. The output of the condenser coil is connected by means of tubing to the filter-drier 104 which is connected to the input side of the reservoir 106. The output of the reservoir is connected to the refrigerant sight glass 108 which is connected to the refrigerant solenoid valve 110 thence to the expansion valve 112 which is subsequently connected to the water elimination coil 50a. The output of the water elimination coil is connected to the accumulator 114 which is connected to the suction side input 99 of the compressor 100. Thus, those skilled in the art will recognize that the heat transfer system comprising the above-identified units comprises a closed series loop and the refrigerant in the system will not escape to the outside environment and simiarly those will be no transfer of outside air into the heat transfer system. The method of operation of the heat transfer system is well known to those skilled in the art and accordingly will not be described herein.

Automatic Control Units (ACU) Nos. 1 and 2, 118 and 120, respectively, are provided. The ACUs are of a type known to those skilled in the art which have a monitoring sensor (in this particular situation a pressure sensor) and are capable of operating a servo motor in a predetermined manner to accomplish a desired result. In my invention, ACU Nos. 1 and 2, 118 and 120, respectively, are operably connected to motors, 112 and 124, respectively. The motors 112 and 124 are also operably connected to the coil louvers 46a and outside air louvers 116a. Thus, when the pressure sensor preceives a given pressure, the ACU will operate the motor to adjust the louvers to attempt to maintain a predetermined pressure in the heat transfer system. Thus, as the pressure perceived by the pressure sensor varies, the louvers will be opened or closed accordingly.

There is operably connected at the suction side 99 of the compressor 100 a pressure sensor of ACU No. 1, 118, which is operably connected to the coil louvers 46a through the motor 122.

The discharge side 101 of the compressor 100 is operably connected to ACU No. 2, 120, by means of a pressure sensor in the discharge line of the compressor. ACU No. 2 is operably connected to the outside air louvers 116a through the motor 124 and is capable of moving the outside air louvres 116 to a position which is a function of the pressure perceived by the pressure sensor.

While the automatic control units such as the ones described above are well known in the art, this is the first time known to the inventor that such units have been used in the particular manner described or to perform the above-identified function.

As is known to those having ordinary skill in the art, the compressor and consequently the heat transfer system will perform at greatest efficiency when it is operated at full load conditions. Full load condition is dependent on the type and model of compressor. Therefore, the conditions at which greatest efficiency will occur cannot be stated specifically except to state that it is when the compressor is operated at full load. The automatic control units aid in maintaining full load conditions on the compressor.

ACU No. 1 is designed so that if the suction pressure increases above the full load condition, the coil louvres 46a will be closed an amount sufficient to lower the suction pressure to the desired value. Similarly, if the suction pressure decreases, the coil louvres will be opened an amount sufficient to return the discharge pressure to full load conditions. Such operation insures that the compressor will be operated at its most efficient condition and thus at its most economical condition.

ACU No. 2 has a pressure sensor located at the discharge side output 101 of the compressor and is able to control the position of the outside air louvers 116a. As the discharge pressure of the compressor increases, the outside air louvers will be opened by ACU No. 2. Similarly, if the discharge pressure of the compressor decreases, ACU No. 2 will automatically close the outside air louvres 116a to a position sufficient to return the discharge pressure to the desired level. This particular method of operation tends to keep the compressor operating at maximum efficiency.

A power source 135 is provided for supplying electrical power to the units requiring it.

Referring to the figures generally, the operation of the system will now be described. The compressor is activated in a conventional manner and the refrigerant in the heat transfer system begins to flow in the direction of the arrow 130. The temperature of the water elimination coil decreases and the temperature of the condenser coil increases.

The fan motor is also energized and the exhaust fan begins to expel air from the elimination chamber. Consequently air is drawn into the elimination chamber from the mixing chamber. Air is drawn into the mixing chamber past the coil louvers and the outside air louvers. Accordingly, air is drawn into the precipitation chamber through the air intake channel.

Outside air which enters the air intake channel 50 through the input port passes the air intake louvers, and through the air filters. After passing through the air filters, the air then comes into contact with the water elimination coil. Since the water elimination coil has been cooled to just above the freezing point of water, water will precipitate onto the water elimination coil from the passing air and fall into the drain pan.

The water which falls into the drain pan passes to the water collection tank. At desired times, the water in the water collection tank is pumped to the water storage tank. As the water is pumped into the water storage tank, chemicals from the chemical storage tank are added to it by means of the chemical inducing pump.

The water in the chemical storage tank is retained there until it is desired to use it.

The air which has been sucked into the precipitating chamber through the input port travels into the mixing chamber where it is mixed with outside air which has entered through the air vent. The air in the mixing chamber is sucked into the elimination chamber where it passes the condenser coil. As the air passes the heated condenser coil, there is a transfer of heat from the condenser coil to the air. Consequently, the air cools the condenser coil and thus the air becomes heated. The air in the elimination chamber is then expelled out through the exhaust vent by means of the exhaust fan.

Since it is highly desirable to operate the compressor at maximum efficiency and thus at full load conditions, there is in the suction side input of the compressor a pressure sensor for monitoring the pressure in that portion of the heat transfer system. Should the pressure in the suction side of the compressor increase above the desired or optimum level (which would be due to an overly large amount of heat being transferred to the water elimination coil from the surrounding air), ACU No. 1 will automatically activate the motor 122 and begin to close the coil louvers, thus restricting the amount of air which will travel through the precipitating chamber and consequently decrease the amount of heat energy transferred from the air to the water elimination coil thus causing the pressure in the suction side of the compressor to decrease to the desired value.

If the pressure at the suction side input of the compressor decreases below the desired or optimum level, ACU No. 1 will automatically open the coil louvers so that the air flow in the precipitating chamber increases, causing the amount of heat transferred to the water elimination coil from the surrounding air to increase. This in turn will cause the pressure at the suction side input of the compressor to increase to the desired level.

Similarly, a pressure sensor is provided in the discharge side output of the compressor for monitoring the pressure in that portion of the heat transfer system. If the pressure on the discharge side output of the compressor begins to increase, it is monitored by the pressure sensor which is connected to ACU No. 2 which controls the position of the outside air louvers. Such a pressure increase would be due to an insufficient transfer of heat from the condenser coil to the air passing the condenser coil. Consequently, ACU No. 2 is programmed to open the outside air louvers, thus increasing the amount of outside air (which enters the air vent) which will pass the condenser coil. The pressure at the discharge side output will then decrease to the desired level. It will be noted that this is accomplished since the volume of air per unit time drawn by the exhaust fan is a constant under design static pressure.

As can be seen, if the pressure at the discharge side output of the compressor decreases, ACU No. 2 causes the outside air louvers to close, thus causing the air which passed the condenser coil to comprise a smaller proportion of outside air which entered the mixing chamber through the air vent. The pressure at the discharge side output will then increase to the desired level.

Thus, by the automatic control of the coil louvres and the outside air louvers by means of ACUs No. 1 and 2 in relation to the pressure at the suction side input and discharge side output of the compressor, respectively, it is possible to automatically and continually operate the compressor at maximum load and thus at maximum efficiency even though the relative humidity of the air may vary.

It will be seen that a different arrangement of components is possible which will produce the same result. By way of example and not by way of limitation, the condenser coil 75a may be mounted in the opening formed by the panels 25b and 26b and a fan may be mounted in the elimination chamber at the opening in the panels 25b and 26b. The fan should be positioned so as to draw air out of the mixing chamber. Thus, it will be seen that this will accomplish the result desired. It will also be seen that such an arrangement eliminates the need for an elimination chamber.

Clearly what has been shown is a device which is simply constructed and inexpensive to manufacture which is capable of transforming water vapor in the atmosphere into drinkable water at a very reasonable cost.

I claim as my invention:

1. An apparatus for removing water vapor from the atmosphere and converting it into liquid water, comprising:

precipitating chamber means having an input opening, through which air may enter the precipitating chamber means and an output opening through which air may leave the precipitating chamber means;

heat transfer means including a fluid stream in a refrigeration circuit having an energy absorbing element located in the precipitating chamber means and an energy discharging element located outside the precipitating chamber means for conveying heat energy from the energy absorbing element to the energy discharging element;

mixing chamber means having an intake opening connected to the output opening of the precipitating chamber means through which air may enter the mixing chamber means from the precipitating chamber means and an exhaust opening through which air may leave the mixing chamber means, the exhaust opening being located with respect to the energy discharging element so that the air passing through the exhaust opening is directed toward the energy discharging element and including an air vent opening for allowing atmospheric air to enter the mixing chamber without having to enter the input opening of the precipitating chamber means;

outside air louvre means located in the vicinity of the air vent opening for regulating the volume of air capable of entering the air vent opening;

coil louvre means located between the precipitating chamber means and mixing chamber means for regulating the volume of air passing through the output opening of the precipitating chamber means; and command means operably connected to said heat transfer means and also operably connected to both of said louvre means for sensing a condition in the fluid stream of the refrigeration circuit and for controlling the opening and closing of both of said louvre means in response to changes in the condition in the fluid stream to thereby regulate the airflow through said louvre means.

2. The apparatus of claim 1 wherein the heat transfer means comprises: refrigerant; and, compressor means having a suction input fluidically connected to the energy discharging element for subjecting the refrigerant to pressure and a discharge output fluidically connected to the energy discharging element.

3. The apparatus of claim 2, wherein said command means includes first command means operably connected to the suction input of the compressor means and to the coil louvre means for positioning the coil louvre means to a predetermined opening corresponding to a predetermined pressure at the suction input of the compressor means.

4. The apparatus of claim 3, wherein said command means includes second command means operably connected to the outside air louvre means and to the discharge output of the compressor means for positioning the outside air louvre means to a predetermined opening corresponding to a predetermined pressure at the discharge output of the compressor means.

5. An apparatus for obtaining liquid water from the atmosphere comprising:

enclosure means having an input port through which air may enter the enclosure means, an air vent through which air may enter the enclosure means and an exhaust vent through which air may be expelled from the enclosure means, wherein the enclosure means comprises a precipitating portion adjacent to the input port and a mixing portion adjacent to the air vent in which air entering the mixing portion from the air vent is combined with air entering the mixing portion from the precipitating portion;

out side air louvre means mounted in the air vent of the enclosure means for regulating the flow rate of air passing through the air vent;

partition louvre means mounted between the precipitating portion and the mixing portion of the enclosure means for regulating the flow rate of air passing between the precipitating and mixing portions of the enclosure;

heat transfer means, comprising a cooling element, a heating element and a compressor with a suction input and a discharge output, for transferring heat energy from the cooling element to the heating element through a fluid stream in a refrigeration circuit, the cooling element being located in the precipitating portion of the enclosure means and the heating element being located so as to be in the path of the combined air of the mixing portion;

first command means operably connected to the suction input of the compressor and to the partition louvre means including first sensor means for sensing a pressure in the fluid stream of the refrigeration circuit and first control means for controlling the opening and closing of said partition louvre means to thereby regulate the air flow in response to said first sensor means;

second command means operably connected to the outside air louvre means and to the discharge output of the compressor including second sensor means for sensing a pressure in the fluid stream of the refrigeration circuit and second control means for controlling the opening and closing of said outside air louvre means to thereby regulate the air flow in response to said sensor means.

6. The apparatus of claim 5, including fan means for drawing air through the exhaust vent from inside the enclosure means to outside the enclosure means, said fan means including a fan motor being located outside the enclosure means and physically separated from the air stream of the refrigeration circuit.

7. The apparatus of claim 1, including drain pan means located in the enclosure means for catching liquid water which will precipitate from the atmospheric air in the precipitating portion of the enclosure means.

8. The apparatus of claim 7, including water purification means fluidically connected to the drain pan means for chemical treatment of the liquid water.

9. The apparatus of claim 8, including water storage means fluidically connected to the drain pan means for retaining liquid water produced by the apparatus.

10. The apparatus of claim 1 wherein the enclosure means comprises an elimination portion adjacent to the exhaust vent and the elimination portion encloses the heating element of the heat transfer system and the fan means.

11. The apparatus of claim 1 wherein the heat transfer means includes compressor means having a suction input in the fluid stream of the refrigeration circuit, and wherein said command means is operably connected to the suction input of the compressor.

12. The apparatus of claim 1, including fan means for drawing air through the exhaust opening, said fan means including a fan motor located outside the precipitating and mixing chambers and separate from the air stream of the refrigeration circuit.

* * * * *